(12) United States Patent
Yonemura et al.

(10) Patent No.: US 8,758,711 B2
(45) Date of Patent: Jun. 24, 2014

(54) CARRIER FOR NOX REDUCTION CATALYST

(75) Inventors: Masanao Yonemura, Tokyo (JP); Katsumi Nochi, Tokyo (JP); Masashi Kiyosawa, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/994,977

(22) PCT Filed: Dec. 7, 2011

(86) PCT No.: PCT/JP2011/078265
§ 371 (c)(1),
(2), (4) Date: Jun. 17, 2013

(87) PCT Pub. No.: WO2012/086413
PCT Pub. Date: Jun. 28, 2012

(65) Prior Publication Data
US 2013/0287665 A1  Oct. 31, 2013

(30) Foreign Application Priority Data
Dec. 20, 2010  (JP) ................. 2010-283012

(51) Int. Cl.
*B01D 53/56* (2006.01)
*B01J 27/18* (2006.01)
*B01J 37/03* (2006.01)
*B01J 27/182* (2006.01)
*B01J 21/08* (2006.01)
*B01J 21/06* (2006.01)
*B01J 27/14* (2006.01)
*B01J 23/30* (2006.01)
*B01J 35/10* (2006.01)

(52) U.S. Cl.
CPC .............. *B01J 27/182* (2013.01); *B01J 27/18* (2013.01); *B01D 53/565* (2013.01); *B01J 37/03* (2013.01); *B01J 21/08* (2013.01); *B01J 21/06* (2013.01); *B01J 27/14* (2013.01); *B01J 23/30* (2013.01); *B01J 35/10* (2013.01)
USPC ........................................................ 423/239.1

(58) Field of Classification Search
CPC ....................................................... B01D 53/56
USPC ........................................................ 423/239.1
See application file for complete search history.

(56) References Cited

U.S. PATENT DOCUMENTS

| 4,929,586 A | 5/1990 | Hegedus et al. |
| 4,952,548 A | 8/1990 | Kato et al. |

(Continued)

FOREIGN PATENT DOCUMENTS

| JP | 11-42433 A | 2/1999 |
| JP | 11-114427 A | 4/1999 |

(Continued)

OTHER PUBLICATIONS

International Search Report Dated Jan. 24, 2012, issued in Corresponding Application No. PCT/JP2011/078265.

(Continued)

*Primary Examiner* — Timothy Vanoy
(74) *Attorney, Agent, or Firm* — Westerman, Hattori, Daniels & Adrian, LLP

(57) ABSTRACT

A NOx reduction catalyst carrier yields a NOx reduction catalyst with an improved permissible dose of poisoning substances such as arsenic. More specifically, the present invention relates to a NOx reduction catalyst carrier comprising $TiO_2$, having a honeycomb structure and having a specific surface area greater than 100 $m^2/g$.

15 Claims, 1 Drawing Sheet

(56) References Cited

U.S. PATENT DOCUMENTS

| | | | |
|---|---|---|---|
| 5,198,403 A * | 3/1993 | Brand et al. | 502/204 |
| 5,225,390 A * | 7/1993 | Vogel et al. | 502/309 |
| 6,419,889 B1 * | 7/2002 | Boxhoorn et al. | 423/239.1 |
| 2009/0246111 A1 * | 10/2009 | Kato et al. | 423/239.1 |
| 2010/0209323 A1 * | 8/2010 | Augustine et al. | 423/239.1 |
| 2011/0189069 A1 * | 8/2011 | Kato et al. | 423/239.1 |

FOREIGN PATENT DOCUMENTS

| | | |
|---|---|---|
| JP | 11-300213 A | 11/1999 |
| JP | 2000-464 A | 1/2000 |
| JP | 2001-38206 A | 2/2001 |
| WO | 2008/105469 A1 | 9/2008 |

OTHER PUBLICATIONS

Translation of the International Preliminary Report on Patentability (PCT/IB/338) (1 page), (PCT/IB/373) (1 page) of International Application No. PCT/JP2011/078265 mailed Jul. 4, 2013 (Form PCT/ISA/237) (9 pages).

Canadian Office Action dated Apr. 3, 2014, issued in Canadian application No. CA2,822,023 (2 pages).

* cited by examiner

CARRIER FOR NOX REDUCTION CATALYST

TECHNICAL FIELD

The present invention relates to a carrier for a NOx reduction catalyst used in various types of NOx reduction apparatuses. More specifically, the present invention relates to a carrier for a NOx reduction catalyst suitable for use in a NOx reduction apparatus for flue gases from coal-fired boilers.

BACKGROUND ART

As a method for removing nitrogen oxides from flue gases emitted from stationary emission sources such as thermal power plants, an ammonia-added selective catalytic reduction method has been applied, which uses a catalyst carrying $V_2O_5$, $WO_3$, and $MoO_3$ as active ingredients on a $TiO_2$-based catalyst carrier. In this method, $NH_3$ is added as a reductant to cause a NOx reduction reaction ($4NO+4NH_3+O_2 \rightarrow 4N_2 + 6H_2O$) and V, W, and Mo supported on solid acid sites of $TiO_2$ act as active sites.

When a $V_2O_5/TiO_2$-based catalyst is used in the reduction of NOx from flue gases containing nitrogen oxides emitted in a case in which a coal or a heavy oil is used as the fuel, the activity of such a catalyst degrades over time. The degradation of the activity of a catalyst is due to a very small quantity of poisoning components contained in flue gases, such as As and Ca, accumulating on the catalyst and covering the catalyst active sites. In particular, As contained in flue gases is $As_2O_3$ with a high vapor pressure and is oxidized on the catalyst to be converted into $As_2O_5$ with a low vapor pressure ($As_2O_3+O_2 \rightarrow As_2O_5$). This $As_2O_5$ reacts at the solid acid sites, and thus the catalyst activity is lost. Accordingly, when a low-grade coal including a large quantity of arsenic (As), which is a poisoning substance that may considerably affect the catalyst, is used as the fuel, the deterioration of the catalyst occurring due to the rapid loss of solid acid sites caused by As becomes highly problematic.

Incidentally, it has been blown that when an oxide is composited, the solid acid content of the complex oxide usually becomes higher than that of a single-element oxide, although this depends on the type of the element included in the oxide. Focusing on this finding, the inventors have made an attempt to improve the resistance of a catalyst to As by increasing the permissible dose of As by increasing the content of solid acid in a two-component system based on $TiO_2$, such as a $TiO_2/SiO_2$ system (refer to Patent Literature 1, for example).

CITATION LIST

Patent Literature

[Patent Literature 1] Japanese Patent Application Publication No. 11-42433

DISCLOSURE OF THE INVENTION

Problems to be Solved by the Invention

The present invention has been made in consideration of the above-described circumstances, and an object of the present invention is therefore to provide a NOx reduction catalyst carrier capable of obtaining a NOx reduction catalyst with a further improved permissible dose of poisoning substances such as arsenic.

Means for Solving the Problems

In order to improve the resistance of a catalyst to poisoning by As in a system containing Ti, the inventors have focused attention on the above-described solid acid content, and also on a specific surface area, which is not correlated with the solid acid content.

More specifically, a NOx reduction catalyst carrier according to the present invention comprises $TiO_2$, has a honeycomb structure, and has a specific surface area greater than 100 $m^2/g$.

Effects of the Invention

By using the NOx reduction catalyst carrier according to the present invention, a NOx reduction catalyst with a further improved permissible dose of a poisoning substance such as arsenic can be obtained.

DESCRIPTION OF THE EMBODIMENTS

The present invention will be described in detail below. Note that the present invention is not limited to the embodiments described below.

A NOx reduction catalyst carrier according to the present invention comprises $TiO_2$ and has a honeycomb structure. Furthermore, the specific surface area thereof measured for a NOx reduction catalyst carrier molded so as to have a honeycomb structure is greater than 100 $m^2/g$. With such a large specific surface area, the permissible quantity of absorbable As is increased. Thus, the resistance to poisoning by As can be improved. Accordingly, an inflow of As into portions on a downstream side of a NOx reduction catalyst can be inhibited. It becomes more preferable if the specific surface area becomes greater. The specific surface area is particularly preferably 100 to 160 $m^2/g$.

The specific surface area is a value measured by a nitrogen gas adsorption method.

The expression "comprise(s) $TiO_2$" herein refers to a concept including any of a case in which $TiO_2$ alone is comprised, a case in which Ti constitutes a complex oxide together with other elements, and a case in which $TiO_2$ is comprised as a mixture.

Figure 1:
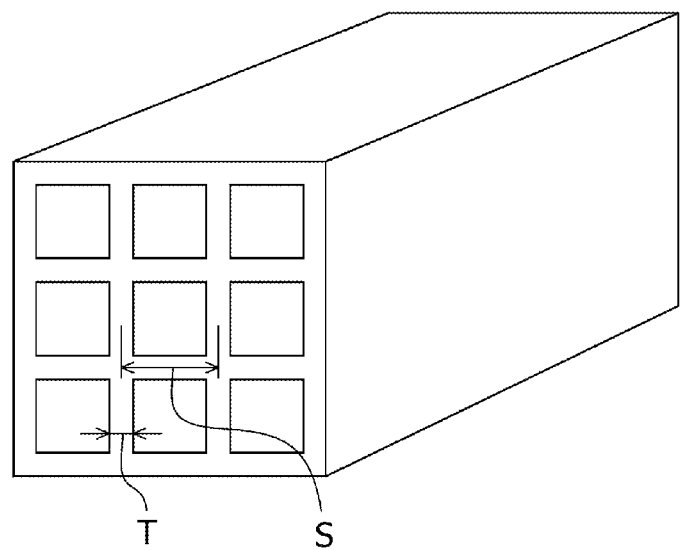
FIG. 1 illustrates an example of a NOx reduction catalyst carrier having a honeycomb structure.

The NOx reduction catalyst carrier according to the present invention has a honeycomb structure. More specifically, the NOx reduction catalyst carrier according to the present invention preferably has a honeycomb structure having a plurality of through holes as reaction flow paths. Examples of such NOx reduction catalyst carriers include a carrier illustrated in FIG. 1, for example. However, the NOx reduction catalyst carrier is not limited to this. The honeycomb structure is not limited to a structure with a rectangular cross section. For example, the honeycomb structure may include a circular cross section, an elliptic cross section, a triangular cross section, a pentagonal cross section, a hexagonal cross section, or the like.

The carrier according to the present invention is preferably a complex oxide comprising one or two or more elements selected from the group consisting of Si, B. P. Zr, and W (hereinafter referred to as "element(s) M"), in addition to Ti. Because any of the above-described elements M to be composited with Ti is an element that is hardly poisoned by As included in flue gases, the element M is suitable for a NOx reduction catalyst.

If a complex oxide comprising two or more elements M in addition to Ti is to be prepared, it is preferable to add other elements to Ti and Si which are base materials. If a complex oxide comprises two or more elements M, a carrier with the resistance to poisoning by As as high as or higher than that achieved when one element is composited with Ti according to the specific surface area can be obtained.

In the case of a two-component system, the ratio by weight of $TiO_2$ and the oxide of the element M (hereinafter referred to as an "M oxide") comprised in the carrier ranges preferably from 50:50 to 99:1. If the ratio of M oxide is below the above-described range, the effect of using the complex oxide may be lost. On the other hand, if the ratio of M oxide exceeds the above-described range, Ti and M may be bonded side by side via oxygen (—Ti—O-M-). As a result, the effect of forming acidic sites, which are sites having acidity imparted due to charges biased on the surface of the solid body, may not be accelerated, and a catalyst with a satisfactory NOx reduction performance may not be obtained because of the low $TiO_2$ ratio. Preferable ranges for respective oxides are as follows: $TiO_2:SiO_2$=80:20 to 99:1, $TiO_2:P_2O_5$=50:50 to 99:1, $TiO_2:B_2O_3$=50:50 to 99:1, $TiO_2:ZrO_2$=50:50 to 99:1, $TiO_2:WO_3$=50:50 to 99:1.

The carrier according to the present invention can be produced by the following process. At first, alkoxide compounds, chlorides, sulfates, or acetates of elements, which are sources of elements for the carrier, are mixed. The mixture is further mixed with water. Then the mixture is stirred in a state of an aqueous solution or sol to cause hydrolysis. By compositing the oxide using alkoxide or the like as a raw material, which is highly reactive, a state in which the metal is more dispersed in the solution is achieved. Thus, a uniform complex oxide can be obtained, and the content of solid acid in the complex oxide can be increased.

A Ti alkoxide is a compound represented by a general formula $Ti(OR^1)_4$ ($R^1$ is an alkyl group having a carbon number of 1 to 20, preferably 2 to 5). Examples of such Ti alkoxide include $Ti(OC_2H_5)$, $Ti(O\text{-}isoC_3H_7)_4$, $Ti(O\text{-}nC_4H_9)_4$, $Ti\{O\text{---}CH_2CH(C_2H_5)C_4H_9\}_4$, $Ti(O\text{---}C_{17}H_{35})_4$, $Ti(O\text{-}isoC_3H_7)_4$, and the like. In addition, Ti sulfates such as $TiOSO_4$, $Ti(SO_4)_2$, and the like and Ti acetates such as $Ti(OCOCH_3)_4$, $TiO(OCOCH)_2$, $Ti_2(OCOCH_3)_6$, and the like can be used.

An Si alkoxide is a compound represented by a general formula $Si(OR^2)_4$ (R is an alkyl group having a carbon number of 1 to 20, preferably 1 to 5). Examples of such Si alkoxide include $Si(OCH)_4$, $Si(OC_2H_5)_4$, $Si(O\text{-}isoC_3H_7)_4$, $Si(O\text{-}tertC_4H_9)_4$, and the like.

Examples of P alkoxides include $P(OCH_3)_3$, $PO(OCH_3)_3$, and the like.

Examples of B alkoxides include $B(OCH_3)_3$, $B(OC_2H_5)_3$, and the like.

Examples of Zr alkoxides include $Zr(OCH_3)_4$, $Zr(OC_2H_5)_4$, $Zr(O\text{-}nC_3H_7)_4$, $Zr(O\text{-}isoC_3H_7)_4$, $Zr(O\text{-}nC_4H_9)_4$, and the like.

A W alkoxide is a compound represented by a general formula $W(OR)_6$ (R is an alkyl group having a carbon number of 1 to 20, preferably 1 to 5). Examples of such W alkoxides include $W(OCH_3)_4$, $W(OC_2H_5)_4$, $W(O\text{-}isoC_3H_7)_4$, $W(O\text{-}terC_4H_9)_4$, and the like.

The quantity of water associated with the hydrolysis reaction is four times as large as the number of moles of the alkoxide and the like. In order to smoothly run the reaction to obtain a homogeneous carrier, the quantity of water included in the reaction mixture is preferably 10 molar ratio or higher, particularly preferably 40 molar ratio or higher, in relation to the alkoxide and the like. The quantity of water is not limited by a specific upper limit. However, even if the quantity of water is excessively increased, the effect would not especially increase and a large size apparatus may be required. Accordingly, in usual cases, water with the molar ratio of about 300 is sufficient.

It is preferable to run the hydrolysis at 50° C. or higher. More specifically, it is preferable to carry out the hydrolysis at a high temperature because the higher the temperature for hydrolysis is, the finer the crystals produced, and the specific surface area becomes larger. A more preferable range of this temperature is 80 to 100° C.

After the mixed solution is neutralized in a desired manner and precipitates are obtained, the solution is stilled for 5 minutes or more, preferably for 2 hours or more, until the solution is aged. The aging is preferably carried out at a temperature as high as that for the hydrolysis. More specifically, the aging temperature is preferably 50° C. or higher and ranges more preferably from 80 to 100° C. When the solution is aged, bonds of different carrier elements via an oxygen atom are newly formed and the specific surface area increases.

The sol obtained by the hydrolysis and the subsequent aging is then filtered to obtain a gelatinized material. Then the gelatinized material is washed and calcined. Thus, a $TiO_2$ carrier, or a carrier consisting of a complex oxide comprising $TiO_2$ and an M oxide can be obtained. The complex oxide includes an amorphous and/or anatase crystal structure. The burning temperature ranges preferably from 300 to 1,000° C., more preferably from 400 to 550° C., although this temperature may be determined according to the composition ratio or the like of the complex oxide. The burning temperature below 300° C. is not preferable because the calcining cannot be sufficiently carried out. On the other hand, the burning temperature higher than 1,000° C. is also not preferable because the resistance to poisoning by As may degrade due to the decrease of the specific surface area. The burning time ranges preferably from 5 minutes to 24 hours, more preferably from 4 to 5 hours, which may be determined according to the composition ratio of the complex oxide, the burning temperature, and the like. The burning time shorter than the above-described range is not preferable because the calcining cannot be sufficiently carried out. On the other hand, the burning time longer than the above-described range is also not preferable because the resistance to poisoning by As may degrade due to the decrease of the specific surface area.

The carrier according to the present invention may also be produced by a conventionally known coprecipitation method alternatively to the above-described sol-gel method.

By supporting at least one NOx reduction active metal selected from the group consisting of $V_2O_5$, $WO_3$, and $MoO_3$ on the carrier obtained in the above-described manner, a NOx reduction catalyst can be obtained which is capable of efficiently reducing NOx in gases containing NOx, such as NO, $NO_2$, with ammonium in the presence of oxygen, and having a high resistance to catalyst-poisoning substances such as As contained in flue gases. The NOx reduction catalyst like this can be used as a molded body having a granular shape, a pellet-like shape, a honeycomb shape, or the like. In addition, a NOx reduction catalyst can be obtained by supporting the above-described active metal oxide on a molded carrier prepared by molding an appropriate carrier into the above-described appropriate shape. For the amount of active metal to be supported, the content of active metal included in the catalyst (active metal/(active metal+carrier)×100) is 0.1 to 30% by weight. More specifically, a preferable range is 0.2 to 5% by weight if the active metal is V, 0.1 to 20% by weight if the active metal is Mo, and 5 to 20% by weight if the active metal is W. The method for supporting the active metal is not limited to a specific method and the NOx reduction catalyst can be produced with the active metal supported by a conventional method. The NOx reduction catalyst obtained in the above-described manner can used for flue gases such as boiler flue gases. In particular, the NOx reduction catalyst according to the present invention can be used for flue gases of which the concentration of catalyst-poisoning material such as As included therein is 1 ppm or lower, preferably 100 ppb or lower, in the case of catalyst contact time of about 10,000 hours or more, for example, depending on the catalyst contact time. If the contact time is shorter than this, the NOx reduction catalyst according to the present invention can be used for flue gases of which the concentration of catalyst-poisoning material is as high as about 100 ppm.

EXAMPLES

Production of Integrated Honeycomb Molded Carrier and Honeycomb Catalyst (Preparation of Comparison Carrier 1)

4.4 L of water held at 80° C. was added to 337.6 g of $Ti(O-iC_3H_7)_4$, which was a Ti source, to cause hydrolysis. Furthermore, the solution was stirred in water held at 80° C. for 2 hours until it was aged. The produced sol was filtered, then the produced alcohol was adequately washed and dried, and then it was calcined by heating at 500° C. for 5 hours.

Ammonium metavanadate ($NH_4VO_3$) and ammonium paratungstate $\{(NH_4)_{10}W_{12}O_{41} \cdot 5H_2\}$ were dissolved in a 10 wt % methylamine aqueous solution so that $V_2O_5$ and $WO_3$ became 5 and 8 parts by weight, respectively, for 100 parts by weight of $TiO_2$. Then the mixed solution was impregnated with a $TiO_2$ powder and dried, and then the resulting material was calcined at 500° C. for 5 hours to obtain a catalyst powder.

3 parts by weight of glass fibers and 3 parts by weight of kaolin as binders, 3 parts by weight of a cellulose acetate as an organic plasticizer, and an ammonia aqueous solution were added to 100 parts by weight of the catalyst powder. Then the mixture was kneaded. The kneaded mass was extruded, then the resulting extruded molded body was dried, and then it was calcined at 500° C. for 5 hours. Thus, a comparison honeycomb molded carrier with lattice spacing (S) of 7.5 mm and the wall thickness (T) of 1.0 mm was obtained (refer to FIG. 1).

(Preparation of Integrated Honeycomb Molded Carriers 1 to 9)

Predetermined amounts of $Ti(O-iC_3H_7)_4$ as a Ti source, $Si(OCH_3)_3$ as an Si source, $P(OCH_3)_3$ as a P source, $B(OCH_3)_3$ as a B source, $Zr(OCH_3)_4$ as a Zr source, and/or ammonium paratungstate $\{(NH_4)_{10}W_{12}O_{41} \cdot 5H_2O\}$ as a W source were mixed together so that they were mixed at compounding ratios illustrated in the following Table 3 in terms of the compounding ratio of oxides of the elements. Then the mixture was added to water held at 80° C. to cause hydrolysis. Furthermore, the solution was stirred in water held at 80° C. for 2 hours until it was aged. The produced sol was filtered, then the produced alcohol was sufficiently washed and dried, and then the resulting material was calcined by heating it at 500° C. for 5 hours. Thus, complex oxides 1 to 9 of two- or three-component system were obtained.

Ammonium metavanadate ($NH_4VO_3$) and ammonium paratungstate $\{(NH_4)_{10}W_{12}O_{41} \cdot 5H_2O\}$ were dissolved in a 10 wt % methylamine aqueous solution so that $V_2O_5$ and $WO_3$ became 5 and 8 parts by weight, respectively, for 100 parts by weight of the complex oxides 1 to 9. Then the mixed solution was impregnated with a complex oxide powder and dried, and then the resulting material was calcined at 500° C. for 5 hours to obtain a catalyst powder.

3 parts by weight of glass fibers and 3 parts by weight of kaolin as binders, 3 parts by weight of a cellulose acetate as an organic plasticizer, and an ammonia aqueous solution were added to 100 parts by weight of the catalyst powder. Then the mixture was kneaded. The kneaded mass was extruded, then the resulting extruded molded body was dried, and then the resulting material was calcined at 500° C. for 5 hours. Thus, integrated honeycomb molded carriers 1 to 9 with lattice spacing (S) of 7.5 mm and the wall thickness (T) of 1.0 mm were obtained (refer to FIG. 1).

(Preparation of Comparison Honeycomb Catalyst and Honeycomb Catalysts 1 to 9)

3.9 g of ammonium metavanadate ($NH_4VO_3$) and 9.0 g of ammonium paratungstate $\{(NH_4)_{10}W_{12}O_{41} \cdot 5H_2O\}$ were dissolved in 55 mL of a 10 wt % methylamine aqueous solution. The solution was then impregnated with 89.0 g of a powder of the above-described $TiO_2$ or the respective complex oxides 1 to 9 and dried, and then the resulting material was calcined at 500° C. for 5 hours. Thus, a catalyst powder including 3 wt % of $V_2O_5$ and 8 wt % of $WO_3$ carried by the carrier was obtained. 80 parts by weight of water was added to 20 parts by weight of the obtained catalyst including $V_2O_5$ and $WO_3$. Then, the solution was adequately stirred in a ball mill to obtain a washcoat slurry. The above-described integrated honeycomb-molded carrier was immersed in the washcoat slurry. The integrated honeycomb molded carrier was then taken out from the slurry, the excess slurry was blown off from the carrier, and the integrated honeycomb molded carrier was dried at 200° C. The amount of coating was 50 g per 1 L (by the apparent volume) of the base material, and the obtained coated substances were used as the comparison honeycomb catalyst and the honeycomb catalysts 1 to 9.

(Measurement of Specific Surface Area)

The specific surface area was measured for the comparison honeycomb molded carrier and the integrated honeycomb molded carriers 1 to 9 by a Brunauer-Emmett-Teller (BET) single-point adsorption method (nitrogen gas adsorption method). The measurement conditions were as described below.

TABLE 1

| Item | Condition |
| --- | --- |
| Sample amount | 0.1 g |
| Pretreatment conditions | Purged at 200° C. for 2 hours under nitrogen atmosphere |
| Adsorption temperature | −196° C. |
| Desorption temperature | Room temperature |
| Detector | Thermal conductivity detector (TCD) |

(Degree of Deterioration)

The degree of deterioration represents the ratio of degradation of the NOx reduction efficiency occurring after a sample gas containing 200 ppm of As was conducted through the comparison honeycomb catalyst and the honeycomb catalysts 1 to 9 for 1 hour. The degree of deterioration was evaluated by using the following expressions (1) and (2):

Degree of deterioration=(NOx reduction efficiency after conducting As)/(Initial NOx reduction efficiency)    (1)

(NOx reduction efficiency)=[(NOx concentration at reaction tube entry−NOx concentration at reaction tube exit)/(NO concentration at reaction tube entry)]×100    (2).

The conditions for the test for the degree of deterioration and the composition of the sample gas were as follows.

TABLE 2

| Item | Condition |
| --- | --- |
| Temperature | 150° C. |
| Amount of gas | 152 Nm³/h |
| Catalyst shape | 150 mm × 150 mm × 750 mm |
| GHSV | 4,500 h⁻¹ |
| Superficial velocity | 3.3 m/s |
| Gas composition | NO: 100 ppm, NH₃: 100 ppm, As: 200 ppm, SO₂: 50 ppm, H₂O: 20%, O₂: 10%, N₂: balance |

Table 3 illustrates results of evaluation tests for the degree of deterioration of the comparison honeycomb catalyst and the honeycomb catalysts 1 to 9 obtained based on the comparison honeycomb molded carriers and the integrated honeycomb molded carriers 1 to 9 having various specific surface areas, as results for Comparative Example 1 and Examples 1 to 9.

TABLE 3

| | Carrier | Compounding ratio | Carrier specific surface area (m²/g) | Degree of deterioration after applying 200 ppm · H of As load |
| --- | --- | --- | --- | --- |
| Comparative Example 1 | TiO₂ system | 100 | 52 | 0.39 |
| Example 1 | TiO₂/SiO₂ system | 80:20 | 130 | 0.56 |
| Example 2 | TiO₂/P₂O₅ system | 60:40 | 108 | 0.51 |
| Example 3 | TiO₂/B₂O₃ system | 50:50 | 102 | 0.49 |
| Example 4 | TiO₂/ZrO₂ system | 50:50 | 113 | 0.53 |
| Example 5 | TiO₂/SiO₂/ZrO₂ system | 85:10:5 | 155 | 0.58 |
| Example 6 | TiO₂/SiO₂/ZrO₂ system | 90:5:5 | 147 | 0.6 |
| Example 7 | TiO₂/SiO₂/P₂O₅ system | 57:38:5 | 146 | 0.53 |
| Example 8 | TiO₂/SiO₂/B₂O₃ system | 47.5:47.5:5 | 132 | 0.51 |
| Example 9 | TiO₂/SiO₂/WO₃ system | 47.5:47.5:5 | 148 | 0.54 |

According to Table 3, it was observed that the degradation of NOx reduction efficiency occurring after applying As loads was inhibited in correlation with the increase of the specific surface area when a carrier with the specific surface area exceeding 100 m²/g was used.

It was also observed that the degradation of NOx reduction efficiency occurring after applying As loads was inhibited in a three-component system based on TiO₂ (Examples 5 to 9) when the specific surface area was increased, similarly to the case of the two-component system (Examples 1 to 4).

Figure 2:
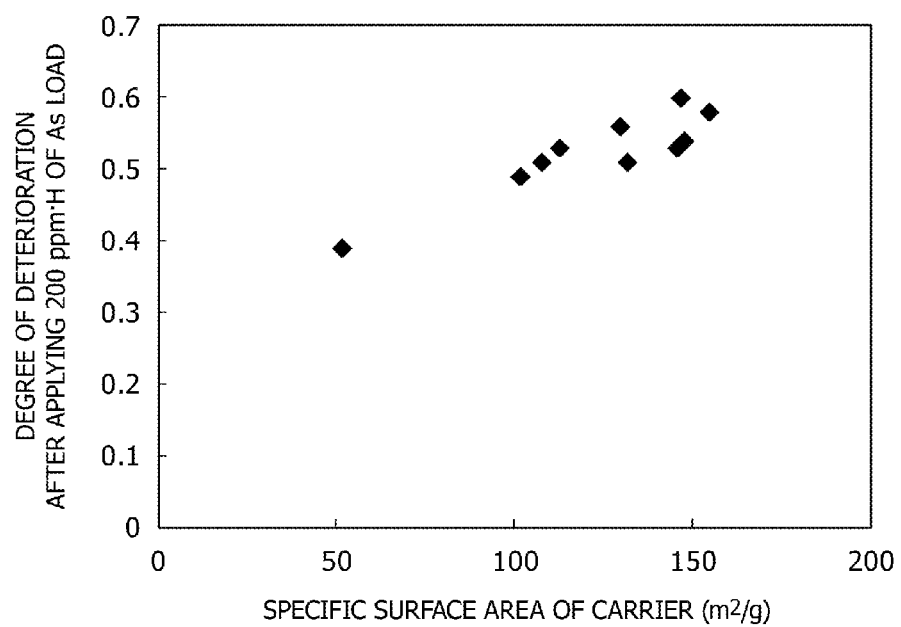
FIG. 2 is a graph illustrating a correlation between degrees of deterioration of honeycomb catalysts for comparison and honeycomb catalysts according to Examples 1 to 9, which may occur due to poisoning by gases containing As, and specific surface areas of carriers used for the catalysts.

In addition, as illustrated in FIG. 2, it was observed that the specific surface area and the degree of deterioration have a correlation regardless of whether the system was a two-component system or a three-component system or of the type of the element constituting the complex oxide.

REFERENCE SIGNS LIST

S Lattice spacing
T Wall thickness

The invention claimed is:

1. A method for reducing NOx from flue gases containing As, the method comprising reducing NOx from the flue gases containing As by using a NOx reduction catalyst in which at least one NOx reduction active metal is supported on a NOx reduction catalyst carrier,
 wherein the NOx reduction catalyst carrier comprises TiO₂, has a honeycomb structure, and a specific surface area of the NOx reduction catalyst carrier is greater than 100 m²/g,
 wherein the TiO₂ reagent for making the NOx reduction catalyst carrier comprises at least one of the group consisting of alkoxides, chlorides, sulfates, and acetates.

2. The method according to claim 1, wherein the NOx reduction catalyst carrier consists of a complex oxide produced by the TiO₂ and an oxide of at least one elements selected from the group consisting of Si, B, P, Xr, and W.

3. The method according to claim 2, wherein the NOx reduction catalyst carrier is produced by a coprecipitation method or a sol-gel method.

4. The method according to claim 2, wherein the flue gases containing As are flue gases from coal-fired boilers.

5. The method according to claim 2, wherein the complex oxide has an amorphous and anatase TiO₂ crystal structure.

6. The method according to claim 2, further comprising a hydrolysis step of mixing the TiO₂ reagent and the oxide reagent for making the NOx reduction catalyst carrier, mixing the mixture with the water, and obtaining a complex oxide,
 wherein the hydrolyze step is performed at a temperature in range of 80° C. to 100° C.

7. The method according to claim 6, further comprising an aging step of stirring solution obtained by the hydrolysis step for a predetermined time,
 wherein the aging step is performed at a temperature in range of 80° C. to 100° C.

8. The method according to claim 7, further comprising a burning step of burning a gelatinized material obtained by the aging step,
 wherein the burning step is performed from 4 to 5 hours.

9. The method according to claim 6, wherein the oxide reagent for making the NOx reduction catalyst carrier comprises at least one of the group consisting of alkoxides, chlorides, sulfates, and acetates.

10. The method according to claim 1, wherein the NOx reduction catalyst carrier consists of a complex oxide produced by the TiO₂ and an oxide of at least two elements selected from the group consisting of Si, B, P, Xr, and W.

11. The method according to claim 10, wherein the NOx reduction catalyst carrier is produced by a coprecipitation method or a sol-gel method.

12. The method according to claim 10, wherein the flue gases containing As are flue gases from coal-fired boilers.

13. The method according to claim 1, wherein the NOx reduction catalyst carrier is produced by a coprecipitation method or a sol-gel method.

14. The method according to claim 13, wherein the flue gases containing As are flue gases from coal-fired boilers.

15. The method according to claim 1, wherein the flue gases containing As are flue gases from coal-fired boilers.

* * * * *